United States Patent
Wang

(10) Patent No.: US 11,155,184 B1
(45) Date of Patent: Oct. 26, 2021

(54) APPARATUS AND METHOD FOR AUTOMATIC ADJUSTMENT OF DRIVER SITTING POSTURE

(71) Applicant: Robert Bosch GmbH, Stuttgart (DE)

(72) Inventor: Tao Wang, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 119 days.

(21) Appl. No.: 16/468,313

(22) PCT Filed: Dec. 12, 2017

(86) PCT No.: PCT/IB2017/057833
§ 371 (c)(1),
(2) Date: Jun. 11, 2019

(87) PCT Pub. No.: WO2018/109656
PCT Pub. Date: Jun. 21, 2018

(30) Foreign Application Priority Data

Dec. 12, 2016 (CN) .......................... 201611144077.1

(51) Int. Cl.
*B60N 2/02* (2006.01)
*B62D 1/187* (2006.01)
*B62D 1/181* (2006.01)

(52) U.S. Cl.
CPC ......... *B60N 2/0248* (2013.01); *B60N 2/0232* (2013.01); *B62D 1/181* (2013.01);
(Continued)

(58) Field of Classification Search
CPC ............... B60N 2/0248; B60N 2/0232; B60N 2002/0268; B60N 2002/0272; B62D 1/187; B62D 1/181
(Continued)

(56) References Cited

U.S. PATENT DOCUMENTS

2006/0208169 A1* 9/2006 Breed ................ G06K 9/00624
250/221
2010/0039224 A1* 2/2010 Okude .................. B60R 25/257
340/5.83
(Continued)

FOREIGN PATENT DOCUMENTS

CN 103029599 A 4/2013
DE 102006035439 5/2007
(Continued)

OTHER PUBLICATIONS

International Search Report for Application No. PCT/IB2017/057833 dated Apr. 3, 2018 (English Translation, 2 pages).

*Primary Examiner* — Jonathan M Dager
*Assistant Examiner* — Jean W Charleston
(74) *Attorney, Agent, or Firm* — Michael Best & Friedrich LLP

(57) ABSTRACT

The present invention relates in general to the adjustment of vehicle seat and steering wheel positions, and in particular relates to an apparatus and method for automatic adjustment of driver sitting posture. The method for automatic adjustment of driver sitting posture according to the present invention comprises the following steps: determining an ergonomic parameter corresponding to a user; calculating a seat position parameter according to the ergonomic parameter; adjusting a seat position according to the seat position parameter; calculating a steering wheel position parameter according to the ergonomic parameter; and adjusting a steering wheel position according to the steering wheel position parameter.

14 Claims, 2 Drawing Sheets

(52) U.S. Cl.
CPC ...... *B62D 1/187* (2013.01); *B60N 2002/0268* (2013.01); *B60N 2002/0272* (2013.01)

(58) Field of Classification Search
USPC .......................................................... 701/49
See application file for complete search history.

(56) References Cited

U.S. PATENT DOCUMENTS

| | | | | |
|---|---|---|---|---|
| 2010/0276973 | A1* | 11/2010 | Zenk | B60N 2/914 |
| | | | | 297/284.3 |
| 2013/0009761 | A1* | 1/2013 | Horseman | A61B 5/18 |
| | | | | 340/425.5 |
| 2013/0253761 | A1* | 9/2013 | Hodorek | G01B 3/56 |
| | | | | 701/33.2 |
| 2014/0052345 | A1* | 2/2014 | Tobin | B60R 16/037 |
| | | | | 701/49 |
| 2016/0107574 | A1* | 4/2016 | Voelkel | H04N 7/183 |
| | | | | 348/148 |
| 2016/0368509 | A1* | 12/2016 | Uppal | B60K 37/04 |
| 2017/0101032 | A1* | 4/2017 | Sugioka | B60Q 3/80 |

FOREIGN PATENT DOCUMENTS

| | | |
|---|---|---|
| JP | S60138850 U | 9/1985 |
| JP | H01127425 A | 5/1989 |
| JP | 2006015872 A | 1/2006 |
| JP | 2013141950 A | 7/2013 |
| JP | 2017033320 A | 2/2017 |

\* cited by examiner

APPARATUS AND METHOD FOR AUTOMATIC ADJUSTMENT OF DRIVER SITTING POSTURE

BACKGROUND OF THE INVENTION

The present invention relates in general to the adjustment of vehicle seat and steering wheel positions, and in particular relates to an apparatus and method for automatic adjustment of driver sitting posture.

Most seats in modern cars are electrically adjustable, also called electric seats. A person's appraisal of car comfort is mostly based on his or her experience of the seat, therefore electric seats fitted to cars must meet two major requirements, namely convenience and comfort. In other words, by means of a control key, the driver can not only achieve the best visual field, which is convenient for operating the steering wheel, pedals and gearstick etc., but can also adjust the seat to an optimal position, to achieve the most comfortable and most habitual sitting angle. To meet these requirements, motor vehicle manufacturers are constantly using mechanical and electrical technical means to manufacture adjustable electric seats.

Many factors must be taken into consideration when adjusting a seat, e.g. a person's height, weight and steering wheel position, but for the average user, it is not an easy matter to adjust the seat to the position most suitable for him or her. In addition, seat adjustment must also take into account the achievement of a match with the steering wheel position, and this further increases the difficulty of seat adjustment. Furthermore, a change in seat position will result in a change in the distance between the airbag and the driver's head, and this might give rise to a safety hazard; this problem has not been recognised in the industry for a long time.

SUMMARY OF THE INVENTION

An object of the present invention is to provide a method for automatic adjustment of driver sitting posture, which has advantages such as increasing driving comfort and safety.

A method for automatic adjustment of driver sitting posture according to one aspect of the present invention comprises the following steps:

determining an ergonomic parameter corresponding to a user;

calculating a seat position parameter according to the ergonomic parameter;

adjusting a seat position according to the seat position parameter;

calculating a steering wheel position parameter according to the ergonomic parameter; and adjusting a steering wheel position according to the steering wheel position parameter.

Preferably, in the abovementioned method, the ergonomic parameter corresponding to the user is determined in the following manner:

receiving an individual parameter associated with the user, the individual parameter comprising one or more of the following: gender, height, weight and age; and searching in a memory for an ergonomic parameter set of a standard human model corresponding to the individual parameter.

Preferably, in the abovementioned method, a position of a heel of a standard human model on a vehicle floor is taken as a reference point, the vehicle floor is taken as a reference plane, and the seat position parameter comprises the horizontal distance from the reference point to a junction point of a trunk and a thigh of the standard human model, the height of the junction point of the trunk and thigh of the standard human model relative to the reference plane, and the height of the head of the standard human model relative to the reference plane.

Preferably, in the abovementioned method, the horizontal distance Shed from the reference point to the junction point of the trunk and thigh of the standard human model, the height Hu of the junction point of the trunk and thigh of the standard human model relative to the reference plane, and the height $H_{head}$ of the head of the standard human model relative to the reference plane, are calculated in the following manner:

$$S_{heel}=L_{Tibia}*\sin)(\theta_5+\theta_7-90°+L_{UL}*\cos\theta_7$$

$$\tan\theta_9=[H_{eye}-H_{shoulder}+(H_{shoulder}-H_{pelvis})*\cos\theta_1+H_H-H_{dashboard}]/S_{dashboard}$$

$$H_{head}=(H_{shoulder}-H_{pelvis})*\cos\theta_1+H_H+H-H_{shoulder}$$

where $L_{Tibia}$ is the length from a knee to the heel of the standard human model, $L_{UL}$ is the length of the thigh of the standard human model, $H_{eye}$ is the height from an eye to the heel of the standard human model, $H_{shoulder}$ is the height from a shoulder to the heel of the standard human model, $H_{pelvis}$ is the height from a pelvis to the heel of the standard human model, H is the height of the standard human model, $\theta_1$ is the included angle between a back of the standard human model and a vertical line, $\theta_5$ is the included angle between the thigh and a calf of the standard human model, $\theta_7$ is the included angle between the thigh of the standard human model and a horizontal line, and $\theta_9$ is the included angle between a lower line of sight of the standard human model and a horizontal line.

Preferably, in the abovementioned method, the steering wheel position parameter comprises the horizontal distance from a steering wheel centre to the junction point of the trunk and thigh of the standard human model, and the height of the steering wheel centre relative to the reference plane.

Preferably, in the abovementioned method, the horizontal distance $S_{steer}$ from the steering wheel centre to the junction point of the trunk and thigh of the standard human model, and the height $H_{steer}$ of the steering wheel centre relative to the reference plane, are calculated in the following manner:

$$S_{steer}=L_{UA}*\sin\theta_2+L_{LA}*\sin(\theta_3-\theta_2)-S_{head}$$

$$S_{head}=(H_{shoulder}-H_{pelvis})*\sin\theta_1$$

$$H_{steer}=(H_{shoulder}-H_{pelvis})*\cos\theta_1-L_{UA}*\cos\theta_2+L_{LA}*\sin(\theta_3-\theta_2)+H_H$$

where $H_{shoulder}$ is the height from the shoulder to the heel of the standard human model, $H_{pelvis}$ is the height from the pelvis to the heel of the standard human model, $L_{UA}$ is the length of an upper arm of the standard human model, $L_{LA}$ is the length of a lower arm of the standard human model, $\theta_1$ is the included angle between the back of the standard human model and a vertical line, $\theta_2$ is the included angle between the upper arm of the standard human model and a vertical line, and $\theta_3$ is the included angle between the upper arm and lower arm of the standard human model.

Preferably, the abovementioned method further comprises the following steps:

calculating the straight-line distance $D_{nose2steer}$ from the tip of a nose of the standard human model to the steering wheel centre in the following manner:

$$D_{nose2steer} \approx \sqrt{(H_{eye}-H_{shoulder})^2+S_{steer}^2}$$

outputting, to an airbag control unit, the calculated straight-line distance $D_{nose2steer}$ from the tip of the nose of the standard human model to the steering wheel centre.

Preferably, in the abovementioned method, the airbag control unit determines an airbag firing time $TTF_{passenger}$ in the following manner:

$$TTF_{passenger}=TTF_{50}+a*(D_{nose2steer}-D_{nose2steer\_standard})$$

where $TTF_{50}$ is the airbag firing time required when the straight-line distance from the tip of the nose of the standard human model to the steering wheel centre is $D_{nose2steer\_}$standard in a safety specification, and a is a constant related to vehicle speed and determined by experiment.

Another object of the present invention is to provide an apparatus for automatic adjustment of driver sitting posture, which has advantages such as increasing driving comfort and safety.

An apparatus for automatic adjustment of driver sitting posture according to one aspect of the present invention comprises:

an electric motor;

an executing mechanism, configured to adjust positions of a seat and a steering wheel;

a drive mechanism coupled to the electric motor and the executing mechanism, and configured to transfer motive power of the electric motor to the executing mechanism;

a control unit coupled to the electric motor, and configured to:

determine an ergonomic parameter corresponding to a user;

calculate a seat position parameter according to the ergonomic parameter;

adjust a seat position according to the seat position parameter by controlling the electric motor;

calculate a steering wheel position parameter according to the ergonomic parameter;

and adjust a steering wheel position according to the steering wheel position parameter by controlling the electric motor.

BRIEF DESCRIPTION OF THE DRAWINGS

The abovementioned and/or other aspects and advantages of the present invention will be made clearer and easier to understand by the following description of various aspects, which makes reference to the accompanying drawings. In the drawings, identical or similar units are indicated by identical labels. The drawings comprise the following.

DETAILED DESCRIPTION

The present invention is explained more comprehensively below with reference to the accompanying drawings, in which schematic embodiments of the present invention are shown. However, the present invention can be implemented in different forms, and should not be interpreted as being restricted to the embodiments given herein. The embodiments given are intended to make the disclosure herein comprehensive and complete, to communicate the scope of protection of the present invention more comprehensively to those skilled in the art.

In this description, terms such as "contain" and "comprise" indicate that in addition to having units and steps directly and explicitly mentioned in the description and claims, the technical solution of the present invention does not rule out scenarios in which there are other units and steps which are not mentioned directly or explicitly.

Figure 1:
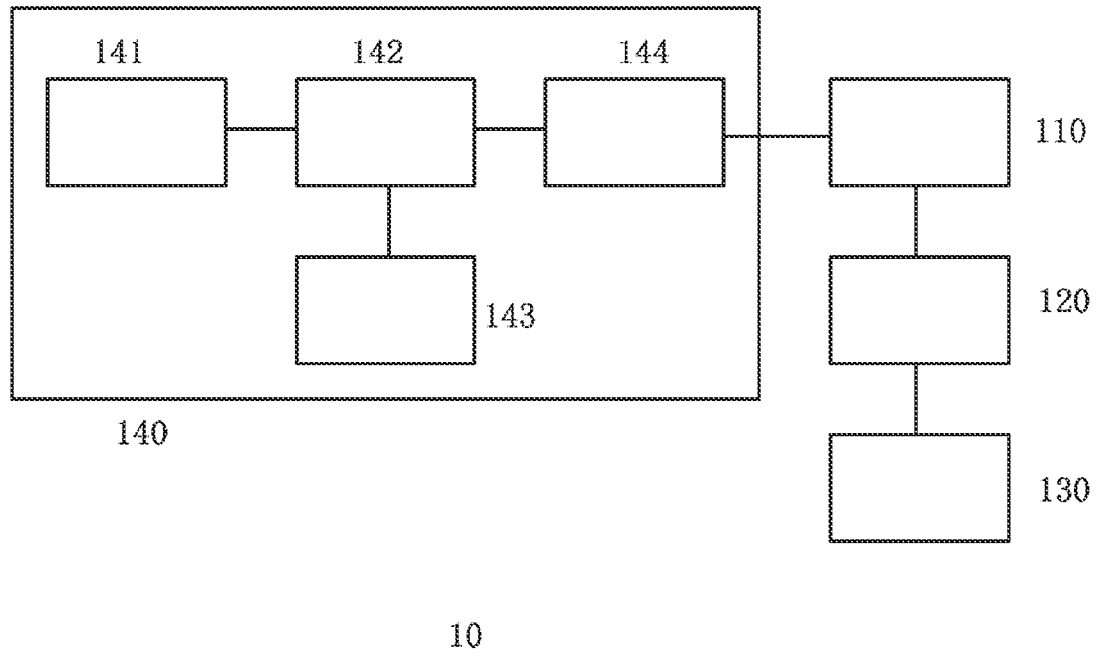
FIG. 1 is a schematic block diagram of an apparatus for automatic adjustment of driver sitting posture according to an embodiment of the present invention.

FIG. 1 is a schematic block diagram of an apparatus for automatic adjustment of driver sitting posture according to an embodiment of the present invention. A system 10 shown in FIG. 1 comprises an electric motor 110, a drive mechanism 120, an executing mechanism 130 and a control unit 140. The drive mechanism 120 is coupled to the electric motor 110, and transfers motive power of the electric motor to the executing mechanism 130 (e.g. a seat adjustment apparatus and a steering wheel adjustment apparatus). The control unit 140 is coupled to the electric motor 110 to control the operation of the latter.

As shown in FIG. 1, the control unit 140 comprises an input module 141, a controller 142, a memory 143 and an output module 144, wherein the controller 142 is coupled to the input module 141, the memory 143 and the output module 144. The operating principles of the control unit are described below.

The input module 141 can receive user data inputted by a user or sent by an external device (e.g. a mobile terminal), e.g. individual parameters associated with the user. Individual parameters may comprise one or more of the following: gender, height and age. The memory 143 stores an ergonomic parameter set, e.g. GB 10000-1988 Human Dimensions of Chinese Adults. The parameter set may be stored according to user category. Table 1 shows by way of example an ergonomic parameter subset of a standard human model of a Chinese male of height 1780 mm.

TABLE 1

| Parameter name | Meaning | Value |
| --- | --- | --- |
| H | height | 1780 mm |
| $L_{UA}$ | upper arm length | 338 mm |
| $L_{LA}$ | lower arm length | 258 mm |
| $L_{UL}$ | thigh length | 505 mm |
| $L_{LL}$ | calf length | 403 mm |
| $L_{Tibia}$ | length from knee to heel | 481 mm |
| $H_{pelvis}$ | height from pelvis to heel | 856 mm |
| $H_{shoulder}$ | height from shoulder to heel | 1455 mm |
| $H_{eye}$ | height from eye to heel | 1664 mm |

The controller 142 accesses the memory 143, and searches for ergonomic parameters corresponding to the user data. The controller 142 can calculate seat position parameters and steering wheel position parameters according to the ergonomic parameters found.

Figure 2:
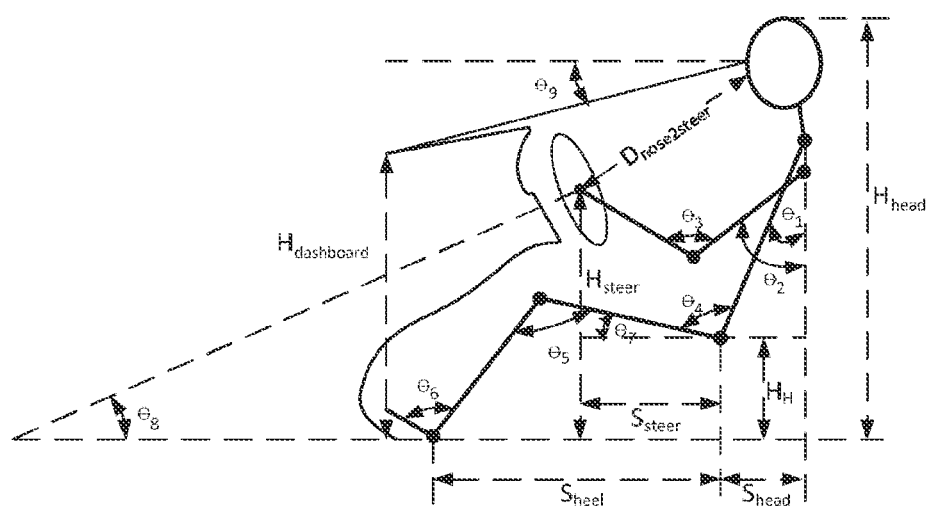
FIG. 2 is a schematic diagram of a standard human model in a driving state.

FIG. 2 is a schematic diagram of a standard human model in a driving state, and will be of assistance in understanding the meaning of the seat position parameters and steering wheel position parameters described below; the meanings of the various labels used in the figure are as stated in table 2 below.

TABLE 2

| No. | Label | Meaning | Notes |
|---|---|---|---|
| 1 | $\theta_1$ | included angle between back of standard human model and vertical line | $14° < \theta_1 < 16°$, default value 15° |
| 2 | $\theta_2$ | included angle between upper arm of standard human model and vertical line | $15° < \theta_2 < 35°$, default value 25° |
| 3 | $\theta_3$ | included angle between upper arm and lower arm of standard human model | $110° < \theta_3 < 130°$, default value 120° |
| 4 | $\theta_4$ | included angle between trunk and thigh of standard human model | $90° < \theta_4 < 115°$, default value 100° |
| 5 | $\theta_5$ | included angle between thigh and calf of standard human model | $100° < \theta_5 < 120°$, default value 110° |
| 6 | $\theta_6$ | included angle between calf and foot of standard human model | $85° < \theta_6 < 95°$, default value 90° |
| 7 | $\theta_7$ | included angle between thigh of standard human model and horizontal line | $4° < \theta_7 < 8°$, value 6° |
| 8 | $\theta_8$ | included angle between steering wheel rod and horizontal line | constant determined by vehicle model |
| 9 | $\theta_9$ | included angle between lower line of sight of standard human model and horizontal line | $\theta_9 > 15°$, default value 20° |
| 10 | $H_H$ | height of junction point (H-point) of trunk and thigh of standard human model relative to vehicle floor (reference plane) | seat position parameter |
| 11 | $H_{dashboard}$ | height of top of vehicle dashboard relative to reference plane | constant determined by vehicle model |
| 12 | $H_{steer}$ | height of steering wheel centre relative to reference plane | steering wheel position parameter |
| 13 | $H_{head}$ | height of head of standard human model relative to reference plane | seat position parameter |
| 14 | $S_{heel}$ | horizontal distance between heel of standard human model and H-point | seat position parameter |
| 15 | $S_{head}$ | horizontal distance between head of standard human model and H-point | |
| 16 | $S_{steer}$ | horizontal distance between steering wheel centre and H-point | steering wheel position parameter |
| 17 | $P_{brake}$ | position of heel of standard human model on vehicle floor (reference point P) | constant determined by vehicle model |
| 18 | $D_{nose2steer}$ | distance from tip of nose of standard human model to steering wheel centre | used to amend airbag firing time |

In this embodiment, seat position parameters comprise the horizontal distance $S_{heel}$ from reference point P to the junction point (H-point) of the trunk and thigh of the standard human model, the height $H_H$ of the H-point relative to the reference plane, and the height $H_{head}$ of the head of the standard human model relative to the reference plane.

Preferably, the controller 142 calculates these seat position parameters according to the following formulae:

$$S_{heel} = L_{Tibia} * \sin(\theta_5 + \theta_7 - 90°) + L_{UL} * \cos\theta_7 \quad (1)$$

$$\tan\theta_9 = [H_{eye} - H_{shoulder} + (H_{shoulder} - H_{pelvis}) * \cos\theta_1 + H_H - H_{dashboard}]/S_{dashboard} \quad (2)$$

$$H_{head} = (H_{shoulder} - H_{pelvis}) * \cos\theta_1 + H_H + H - H_{shoulder} \quad (3)$$

The meanings of the items in formulae (1)-(3) above are the same as in table 1 and table 2, i.e. $L_{Tibia}$ is the length from the knee to the heel of the standard human model, $L_{UL}$ is the length of the thigh of the standard human model, $H_{eye}$ is the height from the eye to the heel of the standard human model, $H_{shoulder}$ is the height from the shoulder to the heel of the standard human model, $H_{pelvis}$ is the height from the pelvis to the heel of the standard human model, H is the height of the standard human model, $\theta_1$ is the included angle between the back of the standard human model and a vertical line, $\theta_5$ is the included angle between the thigh and the calf of the standard human model, $\theta_7$ is the included angle between the thigh of the standard human model and a horizontal line, and $\theta_9$ is the included angle between the lower line of sight of the standard human model and a horizontal line.

The controller 142 will generate an electric motor drive command according to the abovementioned seat position parameters, and output the drive command to the electric motor 110 via the output module 144; thus the controller 142, by controlling the electric motor 110, causes the seat to be adjusted to the required position. In this embodiment, the controller 142 can calculate steering wheel position parameters according to ergonomic parameters. Steering wheel position parameters comprise for example the horizontal distance $S_{steer}$ from the steering wheel centre to the H-point, and the height $H_{steer}$ of the steering wheel centre relative to the reference plane.

Preferably, the controller 142 calculates these steering wheel position parameters according to the following formulae:

$$S_{steer} = L_{UA} * \sin\theta_2 + L_{LA} * \sin(\theta_3 - \theta_2) - S_{head} \quad (4)$$

$$S_{head} = (H_{shoulder} - H_{pelvis}) * \sin\theta_1 \quad (5)$$

$$H_{steer} = (H_{shoulder} - H_{pelvis})\cos\theta_1 - L_{UA} * \cos\theta_2 L_{LA} * \sin(\theta_3 - \theta_2) + H_H \quad (6)$$

The meanings of the items in formulae (4)-(6) above are the same as in table 1 and table 2, i.e. $H_{shoulder}$ is the height from the shoulder to the heel of the standard human model, $H_{pelvis}$ is the height from the pelvis to the heel of the standard human model, $L_{UA}$ is the length of the upper arm of the standard human model, $L_{LA}$ is the length of the lower arm of the standard human model, $\theta_1$ is the included angle between the back of the standard human model and a vertical line, $\theta_2$ is the included angle between the upper arm of the standard human model and a vertical line, and $\theta_3$ is the included angle between the upper arm and lower arm of the standard human model.

The controller 142 will generate an electric motor drive command according to the abovementioned steering wheel position parameters, and output the corresponding drive command to the electric motor 110 via the output module 144, thereby causing the steering wheel to be adjusted to the required position by controlling the electric motor 110.

In this embodiment, the controller 142 is also configured to calculate the straight-line distance $D_{nose2steer}$ from the tip of the nose of the standard human model to the steering wheel centre according to ergonomic parameters, and output a calculation result to an airbag control unit via the output module 144. Preferably, this parameter may be calculated using the following formula:

$$D_{nose2steer} \approx (H_{eye} - H_{shoulder})^2 + S_{steer}^2 \qquad (7)$$

By way of example, the airbag control unit may amend airbag firing time $TTF_{passenger}$ according to the abovementioned straight-line distance $D_{nose2steer}$ in the following manner:

$$TTF_{passenger} = TTF_{50} + a^*(D_{nose2steer} - D_{nose2steer\_standard}) \qquad (8)$$

Here, $TTF_{50}$ is the airbag firing time required when the straight-line distance from the tip of the nose of the standard human model to the steering wheel centre is $D_{nose2steer\_standard}$ in a safety specification, and a is a constant related to vehicle speed and determined by experiment.

Figure 3:
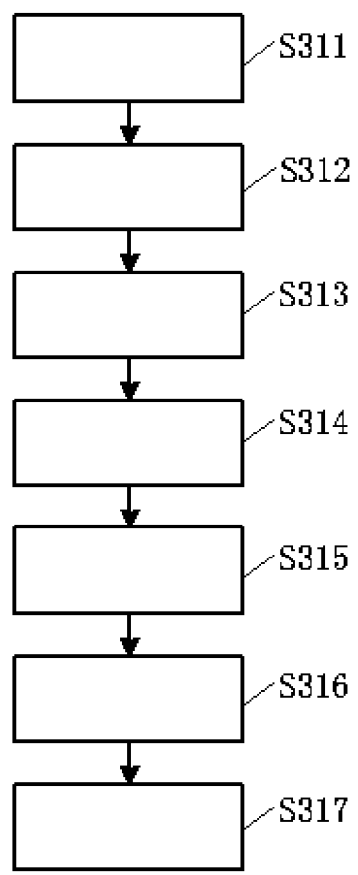
FIG. 3 is a flow chart of a method for automatic adjustment of driver sitting posture according to another embodiment of the present invention.

FIG. 3 is a flow chart of a method for automatic adjustment of driver sitting posture according to another embodiment of the present invention. To facilitate explanation, the above apparatus for automatic adjustment of driver sitting posture shown in FIG. 1 is used to realize the method of this embodiment, but it must be pointed out that the method of this embodiment is not dependent on an apparatus with a specific structure.

As shown in FIG. 3, in step S311, the input module 141 receives individual parameters associated with a user, and as stated above, these individual parameters comprise one or more of the following: gender, height, weight and age. Step S312 is then performed: the controller 142 accesses the memory 143 to search for ergonomic parameters corresponding to user data; these ergonomic parameters may for example take the forms shown in table 1.

Step S313 is then performed: the controller 142 calculates seat position parameters according to the ergonomic parameters found. Seat position parameters comprise for example the horizontal distance Shed from reference point P to the junction point (H-point) of the trunk and thigh of the standard human model, the height $H_H$ of the H-point relative to the reference plane, and the height $H_{head}$ of the head of the standard human model relative to the reference plane. As stated above, the controller 142 may calculate these seat position parameters according to formulae (1)-(3) above.

Then in step S314, the controller 142 generates an electric motor drive command according to the abovementioned seat position parameters, and outputs the drive command to the electric motor 110 via the output module 144, thereby causing the seat to be adjusted to the required position.

Then step S315 is performed: the controller 142 calculates steering wheel position parameters according to ergonomic parameters. Steering wheel position parameters comprise for example the horizontal distance $S_{steer}$ from the steering wheel centre to the H-point, and the height $H_{steer}$ of the steering wheel centre relative to the reference plane. As stated above, the controller 142 may calculate these steering wheel position parameters according to formulae (4)-(6) above.

Then in step S316, the controller 142 generates an electric motor drive command according to the abovementioned steering wheel position parameters, and outputs the drive command to the electric motor 110 via the output module 144, thereby causing the steering wheel to be adjusted to the required position.

Finally, step S317 is performed: the controller 142 calculates the straight-line distance $D_{nose2steer}$ from the tip of the nose of the standard human model to the steering wheel centre according to formula (7) above, and outputs a calculation result to the airbag control unit via the output module 144.

The embodiments and examples set out herein are provided in order to explain, in the best way possible, embodiments according to the present technology and specific applications thereof, and thereby enable those skilled in the art to implement and use the present invention. However, those skilled in the art will know that the descriptions and examples above are provided merely to facilitate explanation and demonstration. The descriptions set out are not intended to cover all aspects of the present invention or to restrict the present invention to the precise forms disclosed.

In view of the above, the scope of the present disclosure is determined by the following claims.

The invention claimed is:

1. A method for automatic adjustment of driver sitting posture, the method comprising:
   determining, via a control unit, an ergonomic parameter corresponding to a user;
   calculating a seat position parameter based on the ergonomic parameter;
   adjusting a seat position based on the seat position parameter;
   calculating a steering wheel position parameter based on the ergonomic parameter; and
   adjusting a steering wheel position based on the steering wheel position parameter,
   wherein a position of a heel of a standard human model on a vehicle floor is taken as a reference point, the vehicle floor is taken as a reference plane, and the seat position parameter comprises the horizontal distance from the reference point to a junction point of a trunk and a thigh of the standard human model, the height of the junction point of the trunk and thigh of the standard human model relative to the reference plane, the height of the head of the standard human model relative to the reference plane, and the ergonomic parameter includes determining an included angle between a thigh and calf of the standard human model.

2. The method according to claim 1, wherein the ergonomic parameter corresponding to the user is determined in the following manner:
   receiving, at the control unit, an individual parameter associated with the user, the individual parameter being at least one selected from the group consisting of gender, height, weight and age; and
   searching in a memory of the control unit for an ergonomic parameter set of a standard human model corresponding to the individual parameter.

3. The method according to claim 1, wherein the horizontal distance Sheet from the reference point to the junction point of the trunk and thigh of the standard human model, the height $H_H$ of the junction point of the trunk and thigh of the standard human model relative to the reference plane, and the height $H_{head}$ of the head of the standard human model relative to the reference plane, are calculated in the following manner:

$$S_{heel}=L_{Tibia}*\sin(\theta_5+\theta_7-90°)+L_{UL}*\cos\theta_7$$

$$\tan\theta_9=[H_{eye}-H_{shoulder}+(H_{shoulder}-H_{pelvis})*\cos\theta_1+H_H-H_{dashboard}]/S_{dashboard}$$

$$H_{head}=(H_{shoulder}-H_{pelvis})*\cos\theta_1+H_H+H-H_{shoulder}$$

where $L_{Tibia}$ is a length from a knee to the heel of the standard human model, $L_{UL}$ is a length of the thigh of the standard human model, $H_{eye}$ is a height from an eye to the heel of the standard human model, $H_{shoulder}$ is a height from a shoulder to the heel of the standard human model, $H_{pelvis}$ is a height from a pelvis to the heel of the standard human model, H is a height of the standard human model, $\theta_1$ is an included angle between a back of the standard human model and a vertical line, $\theta_5$ is an included angle between the thigh and a calf of the standard human model, $\theta_7$ is the included angle between the thigh of the standard human model and a horizontal line, and $\theta_9$ is an included angle between a lower line of sight of the standard human model and a horizontal line.

4. The method according to claim 3, wherein the steering wheel position parameter comprises a horizontal distance $S_{steer}$ from a steering wheel centre to the junction point of the trunk and thigh of the standard human model, and a height $H_{steer}$ of the steering wheel centre relative to the reference plane.

5. The method according to claim 4, wherein the horizontal distance $S_{steer}$ from the steering wheel centre to the junction point of the trunk and thigh of the standard human model, and the height $H_{steer}$ of the steering wheel centre relative to the reference plane, are calculated in the following manner:

$$S_{steer}=L_{UA}*\sin\theta_2+L_{LA}*\sin(\theta_3-\theta_2)-S_{head}$$

$$S_{head}=(H_{shoulder}-H_{pelvis})*\sin\theta_1$$

$$H_{steer}=(H_{shoulder}-H_{pelvis})*\cos\theta_1-L_{UA}*\cos\theta_1+L_{LA}*\sin(\theta_3-\theta_2)+H_H$$

where $H_{shoulder}$ is a height from the shoulder to the heel of the standard human model, $H_{pelvis}$ is a height from the pelvis to the heel of the standard human model, $L_{UA}$ is a length of an upper arm of the standard human model, $L_{LA}$ is a length of a lower arm of the standard human model, $\theta_1$ is an included angle between the back of the standard human model and a vertical line, $\theta_2$ is an included angle between the upper arm of the standard human model and a vertical line, and $\theta_3$ is an included angle between the upper arm and lower arm of the standard human model.

6. The method according to claim 5, further comprising the following steps:

calculating a straight-line distance $D_{nose2steer}$ from a tip of a nose of the standard human model to the steering wheel centre in the following manner:

$$D_{nose2steer}=\sqrt{(H_{eye}-H_{shoulder})^2+S_{steer}^2}$$

outputting, to an airbag control unit, the calculated straight-line distance $D_{nose2steer}$ from the tip of the nose of the standard human model to the steering wheel centre.

7. The method according to claim 6, wherein the airbag control unit determines an airbag firing time $TTF_{passenger}$ in the following manner:

$$TTF_{passenger}=TTF_{50}+a*(D_{nose2steer}-D_{nose2steer\_standard})$$

where $TTF_{50}$ is an airbag firing time required when the straight-line distance from the tip of the nose of the standard human model to the steering wheel centre is $D_{nose2steer\_standard}$ in a safety specification, and "a" is a constant related to vehicle speed.

8. An apparatus for automatic adjustment of driver sitting posture, comprising:
an electric motor;
an executing mechanism configured to adjust positions of a seat and a steering wheel;
a drive mechanism coupled to the electric motor and the executing mechanism and configured to transfer motive power of the electric motor to the executing mechanism; and
a control unit coupled to the electric motor and configured to:
determine an ergonomic parameter corresponding to a user;
calculate a seat position parameter based on the ergonomic parameter;
adjust a seat position based on the seat position parameter by controlling the electric motor;
calculate a steering wheel position parameter based on the ergonomic parameter; and
adjust a steering wheel position based on the steering wheel position parameter by controlling the electric motor,
wherein a position of a heel of a standard human model on a vehicle floor is taken as a reference point, the vehicle floor is taken as a reference plane, and the seat position parameter comprises the horizontal distance from the reference point to a junction point of a trunk and a thigh of the standard human model, the height of the junction point of the trunk and thigh of the standard human model relative to the reference plane, the height of the head of the standard human model relative to the reference plane, and the ergonomic parameter includes determining an included angle between a thigh and calf of the standard human model.

9. The apparatus for automatic adjustment of driver sitting posture according to claim 8, wherein the control unit determines the ergonomic parameter corresponding to the user in the following manner:
receiving, at the control unit, an individual parameter associated with the user, the individual parameter being at least one selected from the group consisting of gender, height, weight and age; and
searching in a memory of the control unit for an ergonomic parameter set of a standard human model corresponding to the individual parameter.

10. The apparatus for automatic adjustment of driver sitting posture according to claim 9, wherein the control unit calculates the horizontal distance Sheet from the reference point to the junction point of the trunk and thigh of the standard human model, the height $H_H$ of the junction point of the trunk and thigh of the standard human model relative to the reference plane, and the height $H_{head}$ of the head of the standard human model relative to the reference plane, in the following manner:

$$S_{heel}=L_{Tibia}*\sin(\theta_5+\theta_7-90°)+L_{UL}*\cos\theta_7$$

$$\tan\theta_9=[H_{eye}-H_{shoulder}+(H_{shoulder}-H_{pelvis})*\cos\theta_1 H_H-H_{dashboard}]/S_{dashboard}$$

$$H_{head}=(H_{shoulder}-H_{pelvis})*\cos\theta_1+H_H+H-H_{shoulder}$$

where $L_{Tibia}$ is a length from a knee to the heel of the standard human model, $L_{UL}$ is a length of the thigh of the standard human model, $H_{eye}$ is a height from an eye to the heel of the standard human model, $H_{shoulder}$ is a height from a shoulder to the heel of the standard human model, $H_{pelvis}$ is a height from a pelvis to the heel of the standard human model, H is a height of the standard human model, $\theta_1$ is an included angle between a back of the standard human model and a vertical line, $\theta_5$ is the included angle between the thigh and a calf of the standard human model, $\theta_7$ is an included angle between the thigh of the standard human model and a horizontal line, and $\theta_9$ is an included angle between a lower line of sight of the standard human model and a horizontal line.

11. The apparatus for automatic adjustment of driver sitting posture according to claim 10, wherein the steering wheel position parameter comprises a horizontal distance $S_{steer}$ from the steering wheel centre to the junction point of the trunk and thigh of the standard human model, and a height $H_{steer}$ of the steering wheel centre relative to the reference plane.

12. The apparatus for automatic adjustment of driver sitting posture according to claim 11, wherein the control unit calculates the horizontal distance $S_{steer}$ from the steering wheel centre to the junction point of the trunk and thigh of the standard human model, and the height $H_{steer}$ of the steering wheel centre relative to the reference plane, in the following manner:

$$S_{steer} = L_{UA}*\sin\theta_2 + L_{LA}*\sin(\theta_3-\theta_2) - S_{head}$$

$$S_{head} = (H_{shoulder} - H_{pelvis})*\sin\theta_1$$

$$H_{steer}(H_{shoulder}-H_{pelvis})*\cos\theta_1 - L_{UA}*\cos\theta_2 L_{LA}*\sin(\theta_3-\theta_2) + H_H$$

where $H_{shoulder}$ is a height from the shoulder to the heel of the standard human model, $H_{pelvis}$ is a height from the pelvis to the heel of the standard human model, $L_{UA}$ is a length of an upper arm of the standard human model, $L_{LA}$ is a length of a lower arm of the standard human model, $\theta_1$ is an included angle between the back of the standard human model and a vertical line, $\theta_2$ is an included angle between the upper arm of the standard human model and a vertical line, and $\theta_3$ is an included angle between the upper arm and lower arm of the standard human model.

13. The apparatus for automatic adjustment of driver sitting posture according to claim 12, wherein the control unit is further configured to:

calculate a straight-line distance $D_{nose2steer}$ from a tip of a nose of the standard human model to the steering wheel centre in the following manner:

$$D_{nose2steer} \approx \sqrt{(H_{eye}-H_{shoulder})^2 + S_{steer}^2}$$

output, to an airbag control unit, the calculated straight-line distance $D_{nose2steer}$ from the tip of the nose of the standard human model to the steering wheel centre.

14. The apparatus for automatic adjustment of driver sitting posture according to claim 13, wherein the airbag control unit determines an airbag firing time $TTF_{passenger}$ in the following manner:

$$TTF_{passenger} = TTF_{50} + a*(D_{nose2steer} - D_{nose2steer\_standard})$$

where $TTF_{50}$ is an airbag firing time required when the straight-line distance from the tip of the nose of the standard human model to the steering wheel centre is $D_{nose2steer\_standard}$ in a safety specification, and "a" is a constant related to vehicle speed.

* * * * *